(12) United States Patent
Edwards (10) Patent No.: US 10,144,377 B2
(45) Date of Patent: Dec. 4, 2018

(54) TRUCK BED GUARD

(71) Applicant: Roadmaster, Inc., Vancouver, WA (US)

(72) Inventor: Jerry A. Edwards, Portland, OR (US)

(73) Assignee: Roadmaster, Inc., Vancouver, WA (US)

( * ) Notice: Subject to any disclaimer, the term of this patent is extended or adjusted under 35 U.S.C. 154(b) by 38 days.

(21) Appl. No.: 15/384,974

(22) Filed: Dec. 20, 2016

(65) Prior Publication Data

US 2018/0170295 A1    Jun. 21, 2018

(51) Int. Cl.
*B60J 10/00* (2016.01)
*B60R 19/44* (2006.01)

(52) U.S. Cl.
CPC .......... *B60R 19/44* (2013.01); *B60Y 2200/141* (2013.01)

(58) Field of Classification Search
CPC .......................... B60R 19/44; B60Y 2200/141
See application file for complete search history.

(56) References Cited

U.S. PATENT DOCUMENTS

| | | | | |
|---|---|---|---|---|
| 3,704,794 A | * | 12/1972 | Flamm | B60P 3/062 410/3 |
| 4,333,678 A | * | 6/1982 | Munoz | B60R 13/01 220/4.28 |
| 5,169,201 A | * | 12/1992 | Gower | B60R 13/01 296/39.2 |
| D388,385 S | * | 12/1997 | Protz, Sr. | D12/167 |
| 7,396,046 B2 | * | 7/2008 | Cole | B60Q 1/2661 224/405 |
| 8,286,996 B2 | | 10/2012 | Grant | |
| 2003/0011180 A1 | * | 1/2003 | Coffman | B60R 11/00 280/748 |
| 2008/0048429 A1 | * | 2/2008 | German | B60P 3/40 280/770 |
| 2009/0123248 A1 | | 5/2009 | Landry | |

* cited by examiner

*Primary Examiner* — Lori L Lyjak
(74) *Attorney, Agent, or Firm* — Erise IP, P.A.

(57) ABSTRACT

A truck bed guard is provided that includes an undulating protective panel having a plurality of longitudinally aligned bends that forms at least one groove and at least one protrusion configured to increase impact resistance. A first flange extends transversely from the top of the panel to provide a first attachment feature, and a second flange extends vertically down beneath the panel to provide a second attachment feature. The guard may be attached to a bed wall of a truck via the first attachment feature and the second attachment feature. A gap between the undulating protective panel and the bed wall is configured to prevent damage to the bed wall. The truck bed guard provides impact resistance to protect the bed wall from objects transported in the truck bed.

20 Claims, 7 Drawing Sheets

TRUCK BED GUARD

BACKGROUND

1. Field

Embodiments of the invention relate generally to systems for providing impact resistance, and more specifically to systems for protecting a wall of a truck bed.

2. Related Art

A truck is designed to carry items in a truck bed. To protect the truck bed surface, a bed liner is often installed. The liner is relatively thin (e.g., less than 2 cm thick) and is either form-fitted to the truck bed or coated to the truck bed. The liner protects against scrapes, nicks, and dents that may occur from the items carried in the truck bed. The liner does not, however, protect against relatively large or heavy items impacting against the truck bed surfaces when the items are moved during driving of the truck. As can be appreciated, if a large or heavy item is being carried in the truck bed and shifts during driving of the truck, the item may impact the truck bed surface. If the item is sufficiently large or heavy, the item may still dent the truck bed, even if a liner covers the truck bed.

As is known, a truck cab is connected to the truck bed. The truck cab includes a rear window. To prevent shifting large or heavy items from impacting and breaking the cab's rear window, a rack/frame may be installed behind the truck cab and proximate the cab's rear window.

SUMMARY

In an embodiment, a truck bed guard is provided. The truck bed guard includes a panel having a plurality of longitudinally aligned bends that forms at least one groove and at least one protrusion configured to increase impact resistance; a top flange extending transversely along a first end of the panel to provide a first attachment feature; and a bottom flange extending vertically from a second end of the panel, opposite the first end, for providing a second attachment feature.

In another embodiment, a protective panel for a truck bed is provided. The protective panel includes a first bend along a first end of the protective panel for forming a first attachment feature to attach the panel to a truck bed wall; a second bend along a second end of the protective panel, opposite the first end, for forming a second attachment feature to attach the panel to the truck bed wall; and an impact protection segment between the first attachment feature and the second attachment feature, wherein the impact protection segment has at least three bends that form an undulating surface configured to increase impact resistance.

In yet another embodiment, an impact resistance guard is provided. The impact resistance guard includes a first flange for mounting to a truck bed wall; a first longitudinal bend configured to form a first façade segment aligned with the truck bed wall; a second longitudinal bend vertically beneath the first bend having an angle such that the guard is bent under the first flange; a third longitudinal bend vertically beneath the second bend that redirects the guard beneath the first façade segment; a fourth longitudinal bend vertically beneath the third bend having an angle such that the guard is bent vertically downward to form a second façade segment substantially aligned with the first façade segment, wherein the first bend, the second bend, and the third bend form a V-shaped groove; and a fifth longitudinal bend vertically beneath the fourth bend having an angle such that the guard is bent under the flange and behind the second façade segment.

BRIEF DESCRIPTION OF THE DRAWINGS

Illustrative embodiments of the invention are described in detail below with reference to the attached drawing figures, which are incorporated by reference herein, wherein.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Embodiments of the invention provide a guard for a truck-bed wall. Heavy objects loaded in the truck bed may collide with any wall of the truck bed, thereby damaging the wall. This may happen either while loading objects into the truck bed, or as objects shift in the bed while the truck is moving. Bed liners only protect a painted bed surface from scratches without preventing dents or bowing of the bed wall, especially when a large or heavy load impacts the bed wall. Racks that are elevated above the truck bed, which are sometimes known as "headache racks," protect the rear window of the cab but not the bed wall. Rails or bars aligned along the railing of the bed may protect the top surface of the truck bed sidewalls, but not the wall itself. What is needed is a bed guard that may be positioned against any wall of the truck-bed that is sleek enough to not occupy a significant portion of the truck bed while also being sturdy enough to withstand large forces applied from a variety of objects.

Figure 1:
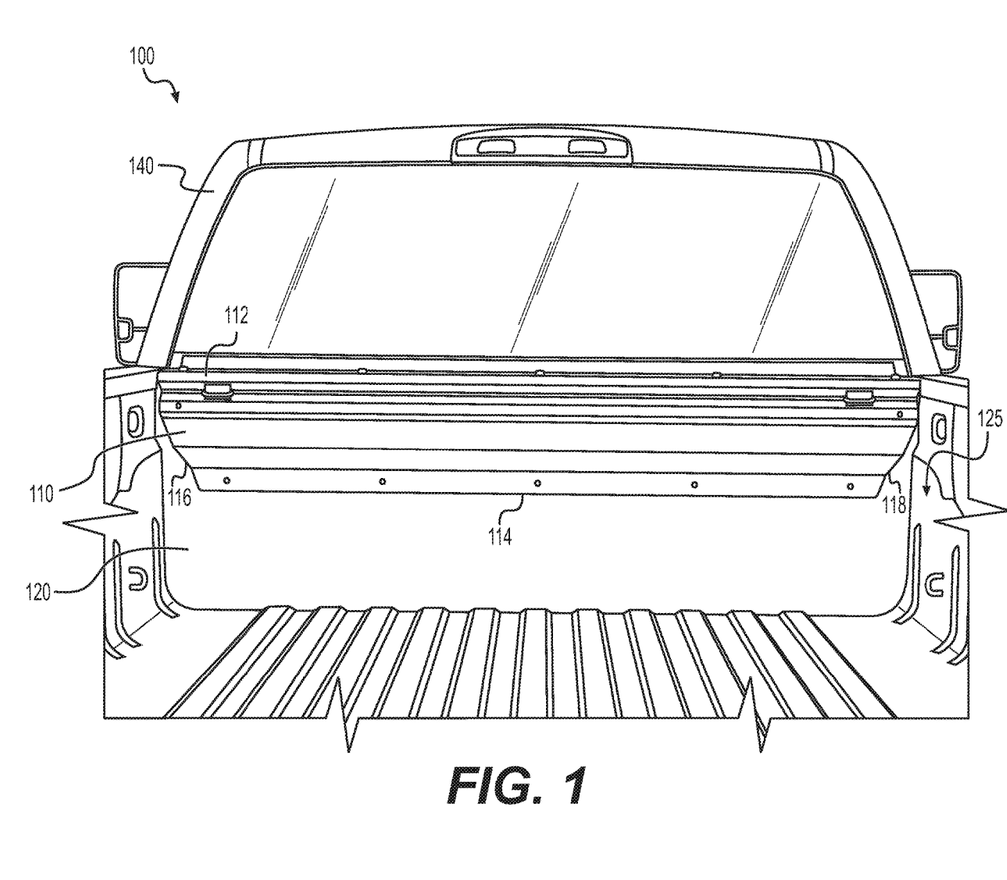
FIG. 1 shows a perspective view of a truck with one embodiment of a truck bed guard attached to a truck bed wall.
Figure 2:
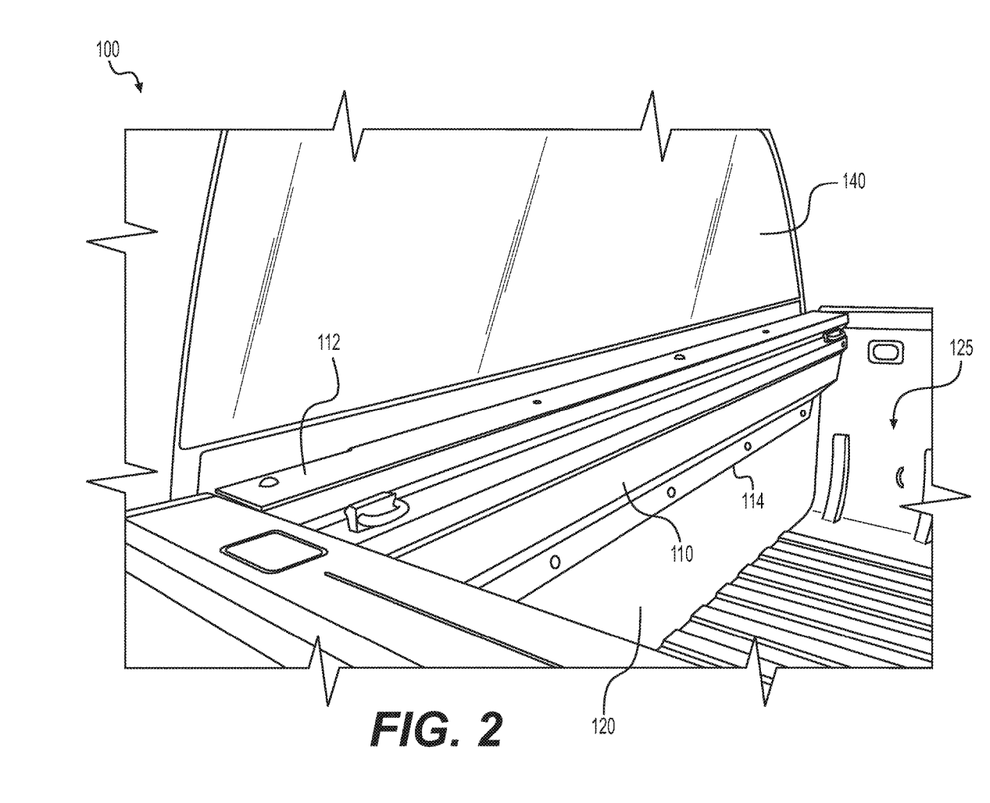
FIG. 2 shows another perspective view of the truck bed guard of FIG. 1.
Figure 3:
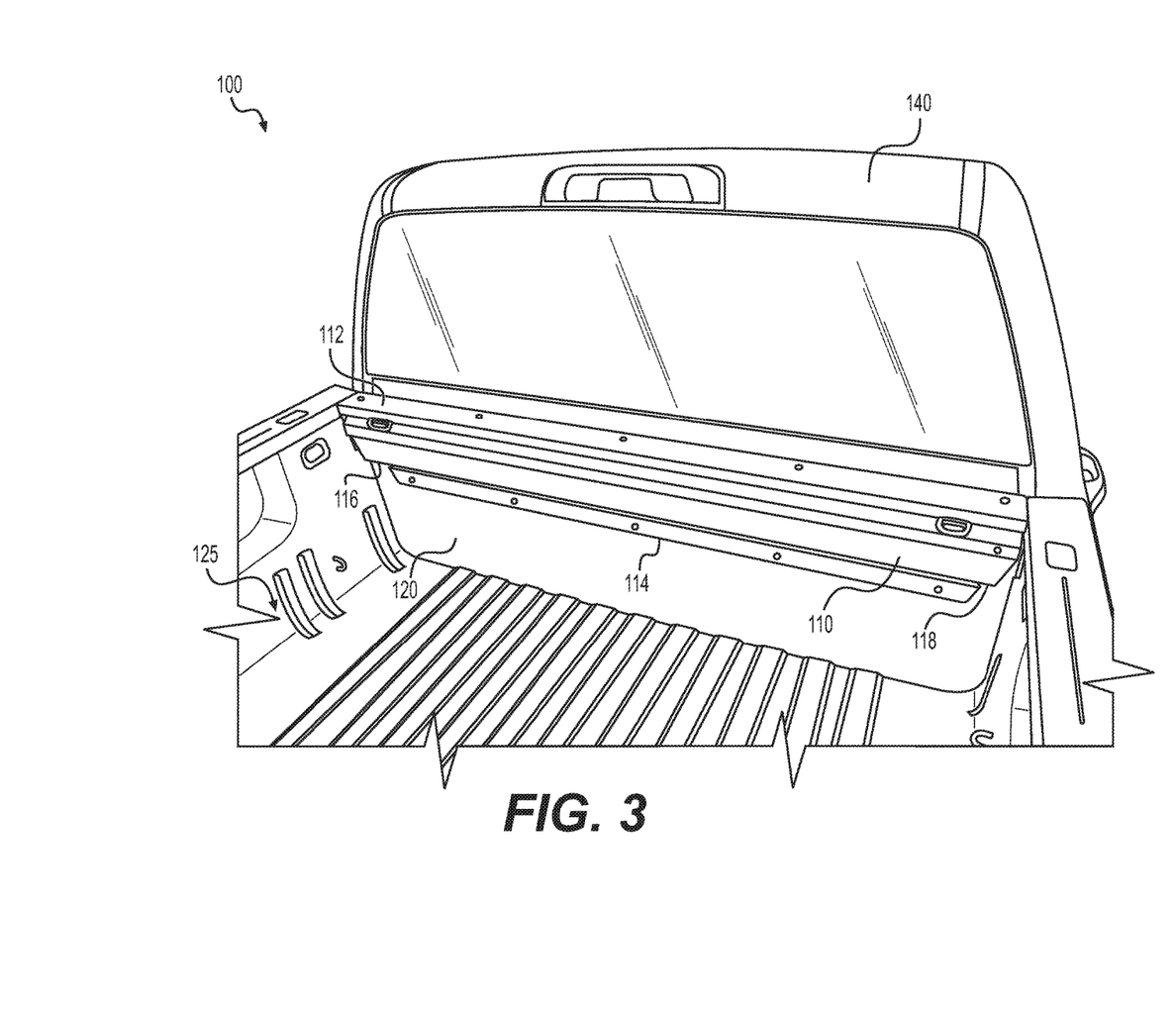
FIG. 3 shows yet another perspective view of the truck bed guard of FIG. 1.

FIG. 1 shows a perspective view of a truck 100 having an exemplary bed guard 110 attached to a bed wall 120. Bed wall 120 forms one wall of a bed 125 adjacent to cab 140. FIGS. 2 and 3 show alternate perspective views of bed guard 110 and are best viewed together with FIG. 1 and the following description. Although FIGS. 1-3 depict bed guard 110 protecting bed wall 120 adjacent cab 140, these illustrations are exemplary only, and it is to be understood that some embodiments of the bed guard may be configured for attachment to any bed wall of the truck bed, including the tail gate, for protecting said bed wall, without departing from the scope hereof.

Bed guard 110 may be made of any suitable material having the requisite strength and stiffness for protecting bed wall 120 based on the desired cargo carried in bed 125. Exemplary materials include but are not limited to metal, steel, steel alloys, aluminum, titanium, carbon fiber, and plastics. In certain embodiments, bed guard 110 is made of 12-gauge steel. Bed guard 110 may be made from a single piece of material that is bent to form a plurality of longitudinally aligned bends, which form at least one groove and at least one protrusion configured to increase impact resistance. The longitudinally aligned bends provide an impact resistance panel that may be mounted to bed wall 120.

For purposes of orienting the reader, the terms "longitudinal", "transverse", and "vertical", and variants thereof will be used to describe certain components or features of embodiments of the invention. Referring to FIG. 1, the longitudinal direction extends from a left side of the truck cab/truck bed to the right side of the truck cab/truck bed when viewing a rear of the truck, as shown in FIG. 1. Alternatively stated, the longitudinal direction extends from the driver's side to the passenger's side of the truck. The transverse direction is generally perpendicular to the longitudinal direction and extends from a front to a rear of the truck. Thus, a component that extends transversely is extending in, for example, a direction generally parallel to a length of the truck bed. The vertical direction extends up and down, for example, from the bottom of the truck bed up to the top of the truck cab.

Bed guard 110 includes a top surface that forms a flange 112, a bottom edge 114, a first edge 116, and a second edge 118. Flange 112 is configured to align in a longitudinal direction with bed wall 120 and to extend in a transverse direction, perpendicular to the longitudinal direction. In some embodiments, flange 112 is configured to extend above a top side of bed wall 120, as depicted in FIGS. 1-3. In other embodiments, flange 112 extends transversely without extending above bed wall 120 (see e.g., FIG. 7). In still other embodiments, flange 112 may straddle the top side of bed wall 120, as best viewed in FIG. 6. By straddling bed wall 120, bed guard 110 rests in position for protecting bed wall 120 as shown in FIGS. 1-3. However, a coupling assembly for easily mounting the bed guard 110 to bed wall 120 is preferably employed for maintaining bed guard 110 in a fixed position while truck 100 is moving. For example, a plurality of mounting holes may be provided in bed guard 110, as further described below in connection with FIGS. 4 and 5.

Figure 4:
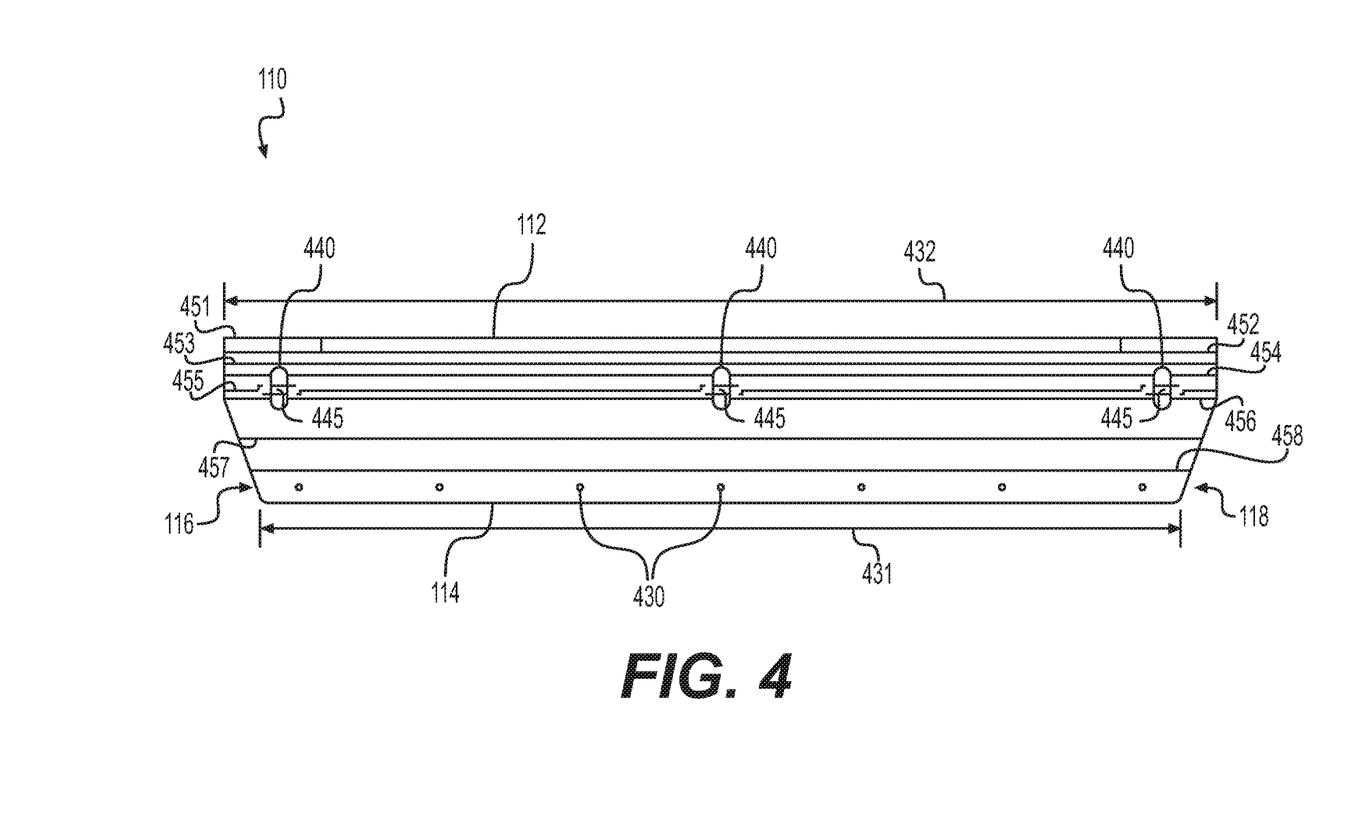
FIG. 4 shows a front view of a truck bed guard, in an embodiment.
Figure 5:
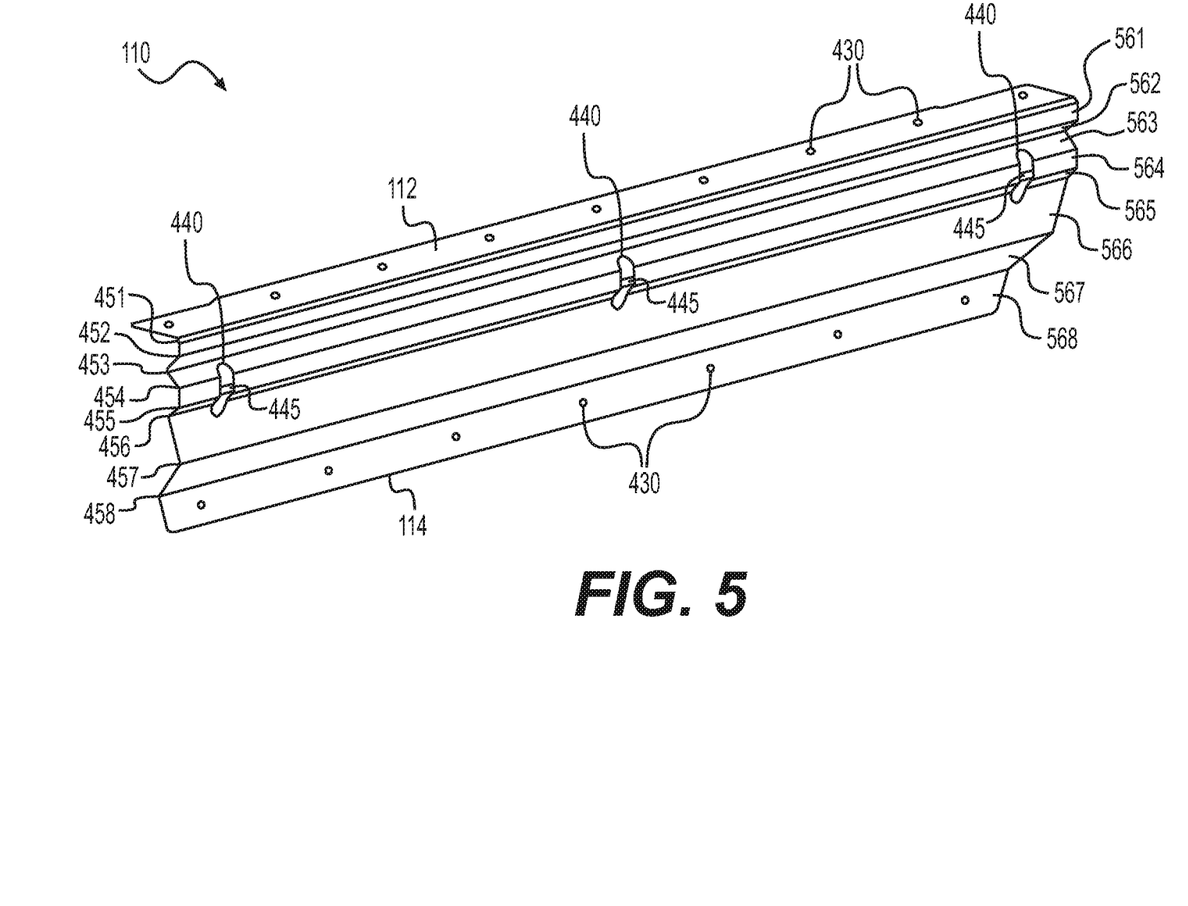
FIG. 5 shows a perspective view of the bed guard of FIG. 4.

FIG. 4 shows a front view of bed guard 110. A plurality of holes 430 is located adjacent bottom edge 114 for mounting bed guard 110 to bed wall 120. Additional holes 430 may also be located in flange 112 for mounting bed guard 110 to bed wall 120, as depicted in FIG. 5, although not all holes 430 in FIGS. 4 and 5 are enumerated for clarity of illustration. Holes 430 may be configured for inserting rivets, bolts, screws or the like to mechanically couple bed guard 110 to bed wall 120. Alternatively, an adhesive may be used in place of, or in addition to, rivets, bolts, or screws. The adhesive may be placed between bed guard 110 and bed wall 120 along adjoining locations, as further described below in connection with FIG. 6.

Figure 6:
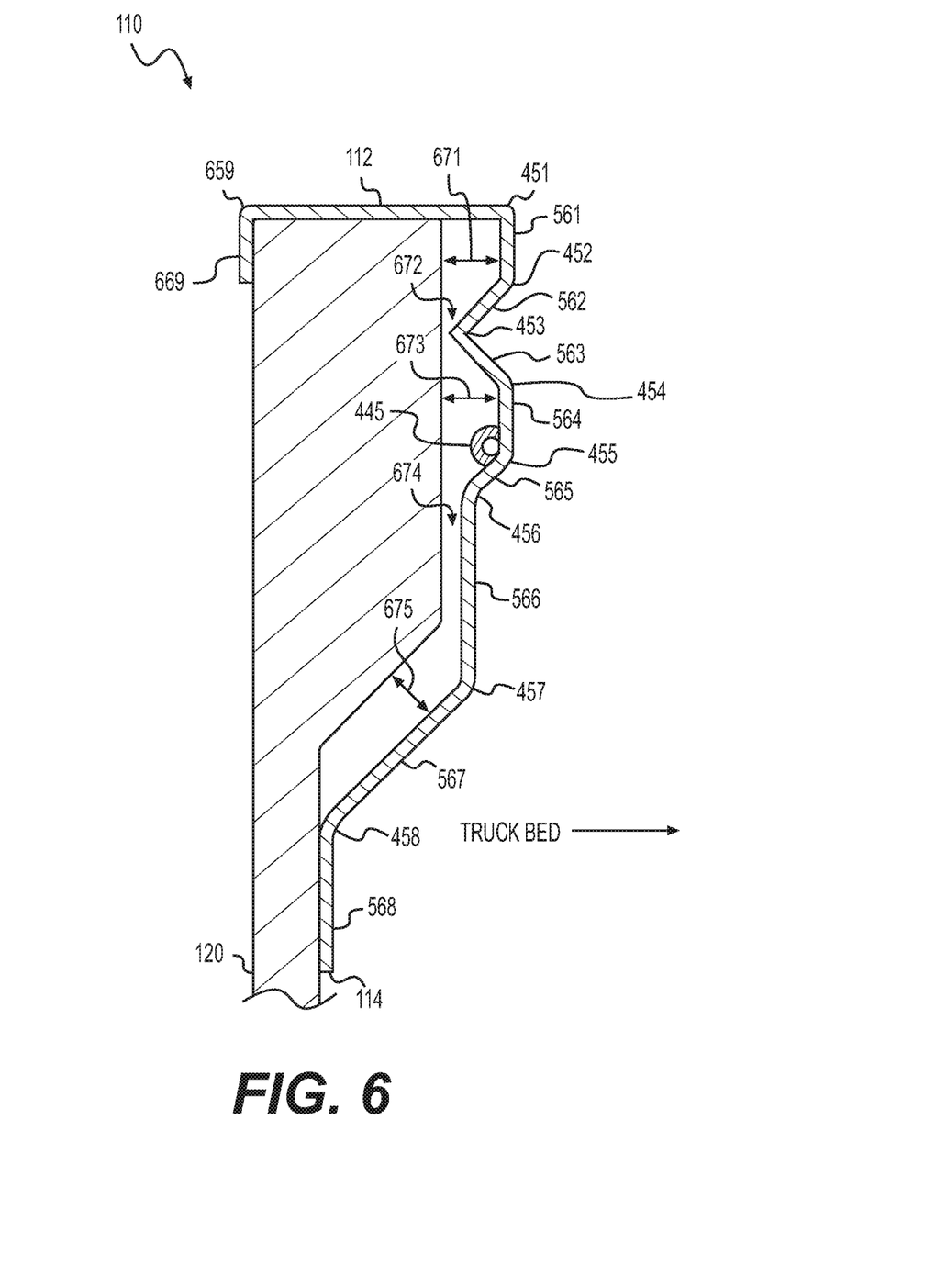
FIG. 6 is a cross-sectional side view showing a profile of the bed guard of FIG. 4 positioned relative to an exemplary bed wall.

One or more slots 440 may be included through bed guard 110. Slots 440 enable a fastener to pass through bed guard 110. Additionally, a bar 445 may be located behind one or more slots 440 for connecting a fastener, as depicted in FIGS. 4 and 6. As depicted in FIG. 4, portions of three bars 445 located behind bed guard 110 are shown with dashed lines to indicate that these portions would otherwise not be visible. Each bar 445 may be welded or otherwise fixed to a back side of bed guard 110. Alternatively, a single bar may span across more than one of slots 440. A portion of bar 445 exposed through a respective slot 440 is configured to be accessible for tying or looping a fastener thereto. Exemplary fasteners include, but are not limited to, a rope, webbing, strap, or chain. The fastener may be tied to bar 445, or connected via a hook, carabiner, or similar device. Slots 440 and bars 445 provide a capability for easily securing objects in truck bed 125 against bed guard 110. This is particularly helpful for objects on wheels, such as all-terrain vehicles, which may otherwise roll back and forth within the truck bed if unsecured.

In certain embodiments, first edge 116 and second edge 118 may taper from top to bottom such that a bottom length 431 is narrower than a top length 432, as depicted in FIG. 4. The tapered bottom length 431 enables bed guard 110 to fit in truck beds having rounded bottom corners, for example.

A plurality of bends extends along the façade of bed guard 110 for adding stiffness and rigidity. The bends may be aligned longitudinally, as depicted in FIGS. 1-7, or they may be aligned vertically without departing from the scope hereof. The increased stiffness and rigidity reduce the amount of deflection and denting that bed guard 110 undergoes from an applied force, thus increasing the impact resistance of bed guard 110. In certain embodiments, bed guard 110 may withstand an applied force of approximately 3500 pounds. For example, bed guard 110 is configured to protect bed wall 120 while transporting a load weighing 3500 pounds that is secured (e.g., tied down) in the truck bed.

FIG. 4 depicts exemplary bends, such as a first bend 451, a second bend 452, a third bend 453, a fourth bend 454, a fifth bend 455, a sixth bend 456, a seventh bend 457, and an eighth bend 458. Although the drawings illustrate eight bends, embodiments of the invention contemplate fewer or more than eight bends. For example, the façade of bed guard 110 may include at least one bend, at least two bends, at least three bends, at least four bends, at least five bends, at least six bends, at least seven bends, or at least eight bends without departing from the scope hereof. The number, size, location, and other features of the bends may be dependent on the particular truck bed shape and size. Bends 451-458 are best viewed via FIGS. 5 and 6, described below.

FIG. 5 shows a perspective view of bed guard 110. The plurality of bends 451-458 forms a series of segments having orientations that vary according to the angle of each bend. Exemplary bend angles are described below in connection with FIG. 6. For example, a first segment 561, a second segment 562, a third segment 563, a fourth segment 564, a fifth segment 565, a sixth segment 566, a seventh segment 567, and an eighth segment 568 are depicted in FIG. 5. Similar to the number of bends, as discussed above, bed guard 110 may include fewer than eight or greater than eight segments without departing from the scope hereof. In embodiments of the invention, the number of bends is associated with or otherwise dictates the number of segments.

In certain embodiments, first segment 561, fourth segment 564, and sixth segment 566 are vertically oriented such that they are substantially perpendicular to flange 112; second segment 562, fifth segment 565, and seventh segment 567 face downwards towards bottom edge 114; and, third segment 563 faces upwards. Again, because the number of bends and segments may be dependent on the truck bed shape and size, and thus, more or less bends/segments may be employed, embodiments of the invention contemplate at least one segment that is vertically oriented and perpendicular to flange 112, at least one segment that faces downwards towards bottom edge 114, and at least one segment that faces upwards.

In certain embodiments, at least a portion of the segments form a protective panel that provides impact resistance and protection for bed while, while flange 112 and a lower-most segment serve as attachment features. More specifically, first through seventh segments 561-567 form a protective panel that provides impact resistance and protection for bed wall 120, while flange 112 and eighth segment 568 serve as attachment features. Flange 112 extends transversely forming a first end of the protective panel. Flange 112 provides a first attachment feature for the protective panel, configured for mounting to a top rail of bed wall 120. Eighth segment 568 forms a bottom flange that extends downwardly and forms a second end of the panel, opposite the first end. The bottom flange (e.g., eighth segment 568) provides a second attachment feature for the protective panel, configured for mounting to bed wall 120 beneath the top rail. The orientation of the bottom flange is substantially perpendicular to top flange 112. Without departing from the scope hereof, the protective panel comprising first through seventh segments 561-567 may be made from one piece of material, while flange 112 and eighth segment 568 are made from separate pieces of material that are mechanically coupled to the protective panel (e.g., via welding).

In other embodiments, the protective panel includes attachment features along the side edges. For example, first edge 116 and second edge 118 may each include an attachment feature for attaching bed guard 110 to bed wall 120. The attachment features along the first edge 116 and second edge 118 may include flanges formed via vertically oriented bends in the protective panel, or the attachment features may include separate brackets or other fastening mechanisms.

FIG. 6 is a cross-sectional side view showing a profile of bed guard 110 positioned relative to an exemplary bed wall 120. Specific dimensions, angles, and the overall profile of both bed guard 110 and bed wall 120 may be varied from the examples depicted in FIG. 6 (see e.g., FIG. 7). For example, the angles of bends 451-458 and the orientations and lengths of segments 561-568, as well as the number of angles and segments, may differ from those depicted in FIG. 6. As noted above, because different truck models and/or truck manufacturers may have differently shaped bed walls, the dimensions, angles, and overall profile of bed guard 110 may be adjusted accordingly. In general, bed guard 110 is configured to adjoin bed wall 120 along flange 112 and along a lower-most segment, namely eighth segment 568, which provide a first and a second attachment feature, respectively. Bed guard 110 optionally includes a ninth bend 659 that forms a back portion 669. As depicted in FIG. 6, back portion 669 hangs over the back side of bed wall 120 and may also adjoin bed wall 120. In certain embodiments, back portion 669 is positioned in front of (e.g., on the truck-bed facing portion) of bed wall 120 (see e.g., FIG. 7). Rivets, bolts, screws, or adhesive may be applied in one or more of these adjoining locations for securing bed guard 110 to bed wall 120.

Figure 7:
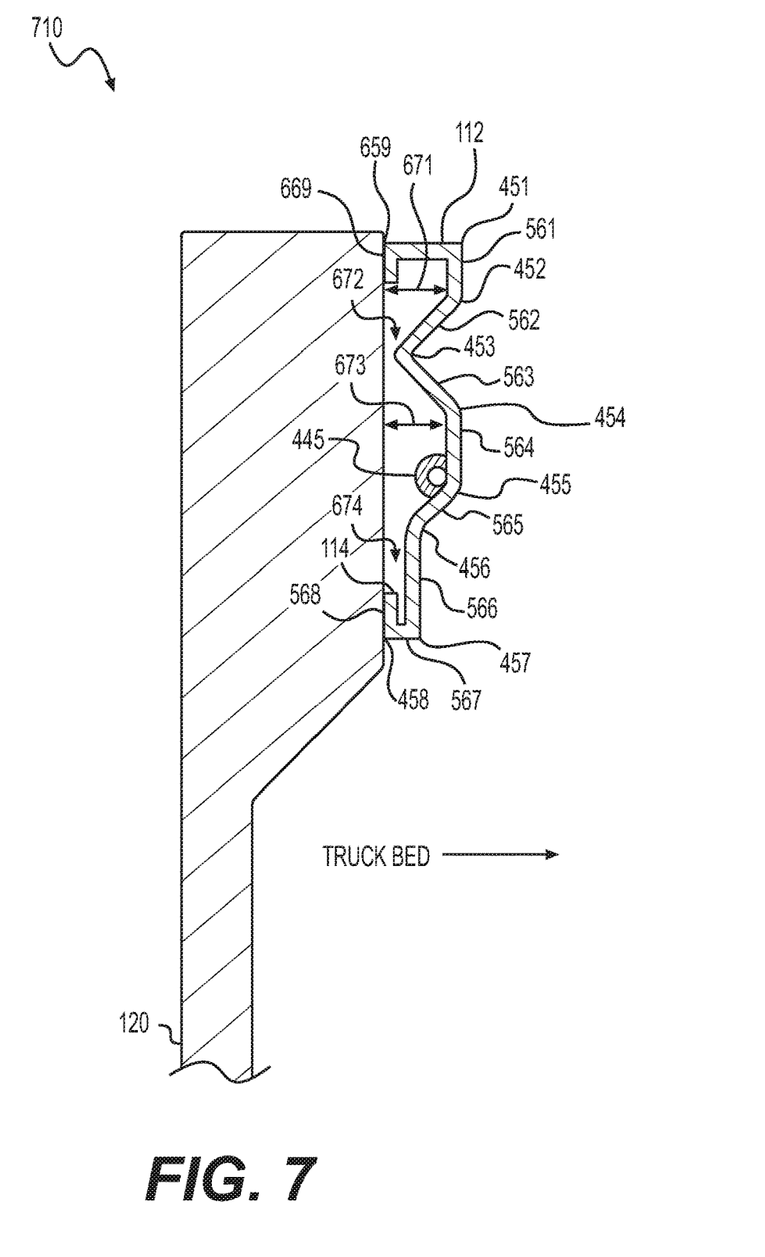
FIG. 7 is a cross-sectional side view showing a profile of another embodiment of the truck bed guard positioned relative to an exemplary bed wall.

FIG. 7 is a cross-sectional side view showing a profile of a bed guard 710 positioned relative to an exemplary bed wall 120. Bed guard 710 is an example of bed guard 110 with attachment features having alternate configurations. For the first attachment feature, back portion 669 is configured for mounting to bed wall 120 on the side facing the truck bed (as opposed to the back of bed wall 120, as shown in FIG. 6), with top flange 112 being shorter and lower (e.g., below the top of bed wall 120). For the second attachment feature, eighth segment 568 is oriented upwards for mounting to bed wall 120 (as opposed to downwards, as shown in FIG. 6). FIG. 7 depicts alternate configurations for attachment features, which may be interchanged with the configurations shown in FIG. 6. In other words, either one of the first attachment feature configurations shown in FIGS. 6 and 7 may be used in combination with either one of the second attachment feature configurations. The illustrations shown in FIGS. 6 and 7 are intended as exemplary only, and in some embodiments, alternative attachment features may be employed without departing from the scope hereof.

Other portions of bed guard 110 may be configured to form a gap from bed wall 120. The gap prevents deflections of bed guard 110 due to applied forces from damaging (e.g., scratching or denting) adjacent portions of bed wall 120. The gap width varies due to the undulating surface of bed guard 110 caused by bends 451-458, and the gap width may also vary due to the shape of bed wall 120. For example, a first gap width 671 between first segment 561 and bed wall 120 is larger than a second gap width 672 between third bend 453 and bed wall 120. A third gap width 673 is larger than second gap width 672 and may be approximately the same as first gap width 671. A fourth gap width 674 is smaller than first gap width 671 and larger than second gap width 672. A fifth gap width 675 may also be presented between bed wall 120 and bed guard 110. In certain embodiments, the first gap width 671 and the third gap width 673 are between about 1 inch and 3.5 inches, second gap width 672 is between about 0.1 inch and 0.5 inch, fourth gap width 674 is between about 0.2 inch and 1 inch, and fifth gap width 675 is between about 0.5 inch and 5 inches. In other embodiments, the undulating surface of bed guard 110 may be corrugated, meaning that the surface includes a plurality of alternating longitudinal protrusions (e.g., ribs or ridges) and longitudinal recessions (e.g., grooves), with gap width from bed wall 120 varying accordingly. Still other embodiments may be configured without a gap, such that any bends in the bed guard 110 are matched to corresponding bends in the bed wall 120. To prevent scratching the surface of bed wall 120 when no gaps are present, a bed liner may be disposed between the bed guard 110 and bed wall 120.

The main surface or forward facing façade of bed guard 110 may be described as undulating due to the plurality of bends 451-458. The term undulating, as used herein to describe an undulating surface, should be construed to mean that the surface may include at least one ridge or groove. In other words, an undulating surface may curve back and forth or have a wavelike profile.

Bed wall 120 may deviate from being straight along the length of bed guard 110 (e.g., longitudinally). For example, bed wall 120 may be slightly bowed along the longitudinal direction. Bowing of bed wall 120 causes variation in gap widths along the longitudinal length of bed guard 110. Accordingly, bends 451-458 may be designed to provide a sufficient minimum gap width despite bowing or truck manufacturing variability to avoid unwanted contact with bed wall 120. The sufficient minimum gap width may be, for example, less than or equal to five inches, less than or equal to three inches, less than or equal to two inches, less than or equal to one inch, less than or equal to 0.5 inch, or less than or equal to 0.2 inch.

A plurality of segments 561-568 are oriented at angles that depend on the degree of bending of each of bends 451-458. For example, first bend 451 may be between about five degrees and one hundred seventy-five degrees, and preferably between about eighty degrees and one hundred degrees. In certain embodiments, bend 451 is about ninety degrees such that flange 112 is approximately perpendicular with first segment 561, as depicted in FIGS. 6 and 7. In other words, flange 112 forms an approximately horizontal surface and first segment 561 forms an approximately vertical surface. First segment 561 is configured to face truck bed 125 for contacting objects therein, and may be considered a first façade segment.

Second bend 452 is bent inward at an angle of between about five degrees and one hundred seventy-five degrees, and preferably between about thirty-five degrees and fifty-five degrees. Third bend 453 forms an angle between about five degrees and one hundred seventy-five degrees, and preferably between about eighty degrees and one hundred degrees. Fourth bend 454 is bent downward and may have an angle between about five degrees and one hundred seventy-five degrees, and preferably between about thirty-five degrees and fifty-five degrees such that fourth segment 564 is substantially vertically aligned. Similar to first segment 561, fourth segment 564 is configured to face truck bed 125 for contacting objects therein and may be considered a second façade segment. In an embodiment, second segment 562, third bend 453, and third segment 563 form a groove that is recessed between first segment 561 and fourth segment 564. The shape of the recessed groove, when viewed from the cross-sectional side view of FIG. 6, may resemble a sideways-oriented V-shape, or it may form a softer curve such as a U-shape or sinusoid (see e.g., FIG. 7), or the groove may curve with some variation between a V-shape and a U-shape.

Fifth bend 455 is bent inward at an angle of between about five degrees and one hundred seventy-five degrees, and preferably between about thirty-five degrees and fifty-five degrees. Sixth bend 456 is bent downward and may have an angle between about five degrees and one hundred seventy-five degrees, and preferably between about thirty-five degrees and fifty-five degrees, such that sixth segment 566 is substantially parallel with fourth segment 564. Similar to first segment 561 and fourth segment 564, sixth segment 566 is configured to face truck bed 125 for contacting objects therein, and may be considered a third façade segment. Fourth segment 564 is distanced further away from bed wall 120 compared to sixth segment 566, as well as the bottom of the V-shaped groove (e.g., behind third bend 453). For example, as depicted in FIGS. 6 and 7, gap width 673 is wider than either gap width 672 or gap width 674. In an embodiment, first segment 561, fourth segment 564, and sixth segment 566 are configured as first, second, and third façade segments, respectively for contacting objects in truck bed 125. In certain embodiments, first, second, and third façade segments are intended to be flat surfaces that are substantially vertically oriented.

Seventh bend 457 is bent inward at an angle of between about five degrees and one hundred seventy-five degrees. Seventh segment 567 is configured to angle bed guard 110 towards bed wall 120. In some embodiments, seventh bend 457 is between about thirty-five degrees and fifty-five degrees and preferably about forty-five degrees, as depicted in FIG. 6. In other embodiments, seventh bend 457 is between about eighty degrees and one hundred degrees, and preferably about ninety degrees, as depicted in FIG. 7.

Eighth bend 458 may be bent upward or downward and may have an angle between about five degrees and one hundred seventy-five degrees. In some embodiments, eighth bend is between about thirty-five degrees and fifty-five degrees and preferably about forty-five degrees, as depicted in FIG. 6. In other embodiments, eighth bend 458 is between about eighty degrees and one hundred degrees, and preferably about ninety degrees, as depicted in FIG. 7. Eighth bend 458 may be configured to align eighth segment 568 to be substantially parallel with sixth segment 566 and to adjoin bed guard wall 120 for fixedly mounting thereto.

In certain embodiments, the angles of bends 451-458 may include any angle that assists with fitting bed guard 110 to bed wall 120 and/or increases impact resistance of bed guard 110. The bends 451-458 may be customized depending on the type of truck bed to be protected and the type of object to be carried in the truck bed. In general, for any bend that angles bed guard 110 towards or away from bed wall 120, a complimentary bend is included to angle bed guard 110 in a generally opposite direction. For example, for any bend that angles bed guard 110 away from a vertical orientation, a complimentary bend is included to return bed guard 110 to a vertical orientation.

In some embodiments, the angles of second bend 452, fourth bend 454, fifth bend 455, sixth bend 456, seventh bend 457, and eighth bend 458 are each between about forty degrees and about fifty degrees, and preferably about forty-five degrees; and, the angles of first bend 451, third bend 453, and ninth bend 659 are between about eight-five degrees and ninety-five degrees, and preferably about ninety degrees, as depicted in FIG. 6.

In another embodiment, all bend angles are approximately ninety degrees such that the profile of bed guard 110 resembles substantially rectangular-shaped bends forming at least one alternating groove and protrusion. In other words, bed guard 110 may have a corrugated surface.

Specific dimensions of bed guard 110 may depend on the type of truck bed to be protected (e.g., for trucks of different make or model). For example, bed guard 110 may have a top length 432 that is between about 24 inches and 120 inches, and preferably between about 48 inches and 102 inches. Bottom length 431 may be between about 24 inches and 120 inches, and preferably between about 48 inches and 102 inches. In certain embodiments, bottom length 431 is shorter than top length 432 due to tapered side walls of bed guard 110. In an embodiment, top length 432 is about 63.5 inches and bottom length is about 59 inches.

The width of flange 112 may be between about 1 inch and 16 inches, and preferably between about 1 inches and 5 inches. In an embodiment, the width of flange 112 is about 3.75 inches.

The height of segments 561-568 may also be determined based on the type of truck bed to protect. For example, first segment 561 may be between about 0.25 inch and 12 inches tall. In an embodiment, first segment 561 is about 0.9 inch tall. Second segment 562 and third segment 563 may each be between about 0.2 inch and 12 inches tall. In an embodiment, second segment 562 and third segment 563 are about 0.75 inch tall. Fourth segment 564 may be between about 0.2 inch and 12 inches tall. In an embodiment, fourth segment is about 0.78 inch tall. Fifth segment is between about 0.2 inch and 12 inches tall. In an embodiment, fifth segment is about 0.7 inch tall. Sixth segment is optional such that it may be between about 0 inch and 12 inches, and preferably between about 1 inch and 5 inches. In an embodiment, sixth segment is about 2.46 inches tall. Seventh segment is between about 0.5 inch and 24 inches, and preferably between about 2 inches and 5 inches. In an embodiment, seventh segment is about 2.73 inches tall. Eighth segment is between about 0.5 inch and 24 inches, and preferably between about 1 inch and 6 inches tall. In an embodiment, eighth segment is about 1.94 inches tall. Optional back portion 669 may be between about 0 inch (because it's optional) and 12 inches tall. In an embodiment, back portion 669 is about 1 inch tall.

In some embodiments, more than one bed guard 110 may be disposed on a truck bed wall 120. For example, two shorter bed guards 110 may be disposed on a truck bed wall 120 in place of one longer bed guard 110. The two shorter bed guards may be aligned with a tire of a vehicle to be transported in the truck bed, for example. The plurality of bed guards 110 may be spaced apart, which may reduce the overall cost due to less protective material that is required.

As noted above, the number of bends/segments, the shape of a particular bend/segment, a longitudinal length of a bend/segment, and angle of a bend, and other parameters and features discussed herein are merely exemplary and may be dependent on the truck bed shape and size. Therefore, reference to a "seventh" bend or "seventh" segment, for example, should not be intended to require that all embodiments of the invention include seven bends or seven segments. For example, any of the bends and segments discussed herein may be used in a design of the bed guard without necessarily requiring that other of the bends and segments be used in the design of the same bed guard. Therefore, a particular bed guard may include segments similar to the first, second, third, and eighth segments but not include segments similar to the fifth and sixth segments. Even further, different-shaped bends and segments may be employed, as described above. Thus, it should be appreciated that embodiments of the invention include a plurality of bends that form a plurality of segments, and the plurality of segments together form at least one groove and/or protrusion in a transverse direction. Further, at least a portion of the plurality of segments may be spaced away from the truck bed when the bed guard is coupled to the truck bed wall, such that a gap is presented between the truck bed wall and the coupled bed guard.

Many different arrangements of the various components depicted, as well as components not shown, are possible without departing from the spirit and scope of embodiments of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of embodiments of the invention.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A truck bed guard, comprising:
   a panel having a plurality of longitudinally aligned bends that forms at least one groove and at least one protrusion configured to increase impact resistance;
   a top flange extending transversely along a first end of the panel to provide a first attachment feature; and
   a bottom flange extending vertically from a second end of the panel, opposite the first end, for providing a second attachment feature.

2. The truck bed guard of claim 1, wherein the panel is configured for mounting to a truck bed wall such that a gap is formed between the panel and the truck bed wall.

3. The truck bed guard of claim 1, wherein the transversely extending top flange is oriented substantially perpendicular to the bottom flange.

4. The truck bed guard of claim 3, wherein the top flange is configured for mounting to a top rail of the truck bed wall and the bottom flange is configured for mounting to a side of the truck bed wall beneath the top rail.

5. The truck bed guard of claim 3, wherein the top flange is configured for mounting to a side of the truck bed wall, and the bottom flange is configured for mounting to the side of the truck bed wall beneath the top flange.

6. The truck bed guard of claim 2, wherein a width of the gap between the panel and the truck bed wall varies based on the plurality of bends such that a first width between the truck bed wall and the groove is smaller than a second width between the truck bed wall and the protrusion.

7. The truck bed guard of claim 1, wherein the groove comprises a V-shaped recession.

8. The truck bed guard of claim 7, wherein the protrusion comprises a flat façade segment positioned adjacent to the V-shaped recession.

9. The truck bed guard of claim 8, wherein the protrusion includes at least one slot for attaching a fastener, thereby enabling an object to be fastened against the flat façade segment.

10. A protective panel for a truck bed, comprising:
    a first bend along a first end of the protective panel for forming a first attachment feature to attach the panel to a truck bed wall;
    a second bend along a second end of the protective panel, opposite the first end, for forming a second attachment feature to attach the panel to the truck bed wall; and
    an impact protection segment between the first attachment feature and the second attachment feature, wherein the impact protection segment has at least three bends that form an undulating surface configured to increase impact resistance.

11. The protective panel of claim 10, wherein the first attachment feature is configured for mounting onto a top rail of a truck bed wall of the truck bed and the second attachment feature is configured for mounting to the truck bed wall of the truck bed beneath the top rail.

12. The protective panel of claim 10, wherein the impact protection segment includes a longitudinal V-shaped groove formed by the at least three bends.

13. The protective panel of claim 12, wherein the impact protection segment includes a longitudinal protrusion adjacent the V-shaped groove.

14. The protective panel of claim 13, wherein the protrusion is spaced from a truck bed wall of the truck bed by a first distance and the V-shaped groove is spaced from the truck bed wall of the truck bed by a second distance that is smaller than the first distance.

15. An impact resistance guard, comprising:
a first flange for mounting to a truck bed wall;
a first longitudinal bend configured to form a first façade segment aligned with the truck bed wall;
a second longitudinal bend vertically beneath the first bend having an angle such that the guard is bent under the first flange;
a third longitudinal bend vertically beneath the second bend that redirects the guard beneath the first façade segment;
a fourth longitudinal bend vertically beneath the third bend having an angle such that the guard is bent vertically downward to form a second façade segment substantially aligned with the first façade segment, wherein the first bend, the second bend, and the third bend form a V-shaped groove; and
a fifth longitudinal bend vertically beneath the fourth bend having an angle such that the guard is bent under the flange and behind the second façade segment.

16. The impact resistance guard of claim 15, further comprising a sixth longitudinal bend vertically beneath the fifth bend having an angle such that the guard is bent downward to form a third façade segment, recessed behind the second façade segment.

17. The impact resistance guard of claim 16, further comprising a seventh longitudinal bend vertically beneath the sixth bend having an angle such that the guard is bent under the flange and behind the third façade segment.

18. The impact resistance guard of claim 17, further comprising an eighth longitudinal bend vertically beneath the seventh bend having an angle such that the guard is bent downwardly to form a second flange substantially perpendicular to the first flange for mounting to the wall.

19. The impact resistance guard of claim 18, wherein the angles of the second bend, the fourth bend, the fifth bend, the sixth bend, the seventh bend, and the eighth bend are each between about forty degrees and about fifty degrees, and wherein the angles of the first bend and the third bend are between about eight-five degrees and ninety-five degrees.

20. The impact resistance guard of claim 18, wherein the first façade segment is separated from the wall by a first gap width, the V-shaped groove is separated from the wall by a second gap width, the second façade segment is separated from the wall by a third gap width, and the third façade segment is separated from the wall by a fourth gap width; and, wherein the first gap width is approximately the same as the third gap width, the fourth gap width is smaller than each of the first and third gap widths, and the second gap width is smaller than the fourth gap width.

\* \* \* \* \*